US008707506B1

(12) United States Patent
Wu

(10) Patent No.: US 8,707,506 B1
(45) Date of Patent: Apr. 29, 2014

(54) WIPER CONNECTING DEVICE

(71) Applicant: Shengzhu Wu, Fujian Province (CN)

(72) Inventor: Shengzhu Wu, Fujian Province (CN)

( * ) Notice: Subject to any disclaimer, the term of this patent is extended or adjusted under 35 U.S.C. 154(b) by 0 days.

(21) Appl. No.: 13/779,749

(22) Filed: Feb. 28, 2013

(30) Foreign Application Priority Data

Dec. 26, 2012 (CN) .................. 2012 2 0727777 U

(51) Int. Cl.
*B60S 1/40* (2006.01)
(52) U.S. Cl.
USPC .................................... 15/250.32
(58) Field of Classification Search
USPC ............ 15/250.32, 250.43, 250.44, 250.361, 15/250.31, 250.46, 250.201
See application file for complete search history.

(56) References Cited

U.S. PATENT DOCUMENTS

| | | | | |
|---|---|---|---|---|
| 6,481,044 B1* | 11/2002 | Journee | ................ | 15/250.32 |
| 2004/0074037 A1* | 4/2004 | Op't Roodt | ............. | 15/250.32 |
| 2010/0005609 A1* | 1/2010 | Kim | ................ | 15/250.32 |
| 2011/0247166 A1* | 10/2011 | Depondt et al. | ......... | 15/250.32 |
| 2012/0144615 A1* | 6/2012 | Song et al. | ............ | 15/250.32 |
| 2012/0227206 A1* | 9/2012 | Depondt | ............. | 15/250.32 |
| 2013/0167317 A1* | 7/2013 | Oslizlo et al. | ........... | 15/250.32 |

* cited by examiner

*Primary Examiner* — Gary Graham

(57) ABSTRACT

A kind of windshield wiper connecting device, disclosed by this utility model, is a combination of various parts whose joint may be applied to installation of different kinds of windshield wiper arms. The device has a base with a connector, on which mounts a functional n-shaped stop pad with a functional external cap above, so as to form an integral wiper joint that is mounted on the main body of various styles of wipers throughout a base. This utility model may connect different structures of wiper arms, greatly improving the wiper adaptation. It features easy assembly, disassembly and replacement.

7 Claims, 20 Drawing Sheets

WIPER CONNECTING DEVICE

DESCRIPTION

BACKGROUND OF THE INVENTION

In accordance with the division of International Patent Classification (IPC), a kind of windshield wiper connecting device, disclosed by this utility model, belongs to the technical field of wiper-arm connection structure, especially about a kind of element that connects the wiper rod with the wiper arm.

The car windshield wiper includes wiper body, connector and wiper arm. Among them usually the connector has a fixed seat and joints, the fixed seat is fixed at the middle part of main body of wiper and the joints are mounted at the fixed seat. After their matching, they are connected with the wiper arm mounted in front of the car glass. Generally speaking, the connector structures are set according to the structure of wiper arm, and most of them adopt a fixed-connection means, a kind of connector matches with a kind of wiper arm. However, all kinds of car wiper arms are different in shape and various in kind, bringing consumers a very heavy limitation while changing and choosing the wiper arm. That any style of wiper can be generally used for installation of any kind of wiper arm with different structure is the technological problem to be solved by the technical staff exactly in this field.

A kind of windshield wiper connecting device, disclosed by Chinese literature 201120190806.3, consists of fixed seat, connecting pieces and top cap through a matching, which may be satisfied with several kinds of wiper arms, but the kind of device is not suitable for other types of wiper arms on the market.

BRIEF SUMMARY OF THE INVENTION

In view of the shortcomings of existing technology, this utility model provides a kind of windshield wiper connecting device with a reasonable structure and a reliable installation, which may conduct a switch connection of different structures of wipers and realize an adaptive installation of multi kinds of wiper arms.

In order to achieve the above-mentioned goal, this utility model is realized through the following technological scheme:

A kind of windshield wiper connecting device includes the base (100) and the corresponding connector (200), among which:

The base (100) may be by means of rivet joint or stuck slot and other arbitrary means to mount itself onto any style of main body of wiper. A slot forms between two side walls on the base (100), and there is a notch (102) respectively at the lower part of two side walls and through-hole circular bulge rings (104) set on outer sides of two side walls.

The connector (200), whose bottom is an opening structure and which is placed on the base (100), the lower end faces of side walls of connector (200) are ladder face, and the connector is composed of connection main body and the bulge half-ring head that forms as a result of a forward extending of two side walls of connection main body. As far as the connection main body (220) is concerned, there is a lower concave surface (223) on the top face, inner notches (224) on both side faces, and segmented side margins (228) at the lower part of two sides, the bulge half-ring in the front is equipped with a movable cap (210), and its two sides of front end of cap (210) has a bulge pressing block (211) each.

The lower concave surface (223) at the top face of connection main body (220) has a match with the n-shaped stop pad (300), at the bottom of both inner sides, there are sticking points (303) that connect separately with the corresponding inner notches (224) of connection main body; at the bottom of both sides of stop pad (300), there are flanged lips (303), and there is a notch stuck-boss (302).

On the side surface of the connection main body (220), there are straight-through circular holes (221) that are used to match with through-hole circular bulge rings (104) on both sides of base; the width of connector (200) head is greater than the width of both sides of connection main body (220).

Further, the wiper connecting device also includes the functional external cap (400), and the cap (400) has a stuck connection with the composite unit of connector (200) and stop pad (300). In the middle of top face of functional external cap (400) there is an opening (401). The straight-through holes are on the straight- through hole (221) position of corresponding connection main body (220) of both sides of functional external cap (401), and through the end face at the trail part (404) and the resilient-strip bosses (226) on both sides under the back end of connector, a fixation is given to limit the slipping out.

Two notch stuck-bosses (302) of stop pad (300) have a corresponding match with the bulge sticking points (402) on the functional external cap (400) respectively.

Further, a resilient strip (222) is set in the middle of connector (200), and inside the strip, there is a stuck boss (230) set; on both sides of connector (200) head there are arc-shaped retaining walls (233), the front end of two retaining walls (233) connect the cap (210); at the back end of main body sets a resilient-strip stuck- boss (226), and at the back end of top face of connection main body sets a stuck boss (225); the position-limiting ditch groove (231) inside the main body, along with the height-limiting ribs(232) at the back of the connection main body (220), achieve a position limiting through their matching.

Inside the cap (210), a passing slot (212) is set, and below it, there is a limit baffle plate (213). The fixed sticking point resilient strips (214) are on both sides of cap (210). The outward-bulge sticking point of this resilient trop is bulged into a corresponding stuck slot on two retaining walls (233). The stuck slot is located on the inner side faceof two retaining walls (233) with a half-opening resilient strip set (227).

The straight-through circular hole (221), located on both side faces of the main body (220) of connection, match the through-hole circular bulge ring (104) into one, which may rotate a certain angle.

Further, the base (100) has a fixed connection with the main body of wiper through the ditch groove at the bottom or through riveting.

After adopting the above-mentioned scheme, this utility model may match with wiper arms with all kinds of structures so as to improve the adaptation of windshield wiper. At the time of installing the connecting device and the wiper arm with any kind of structure, the operation is very simple, and without the help of other tools, a direct disassembly, assembly or replace is feasible.

DETAILED DESCRIPTION OF THE INVENTION

Figure 1:
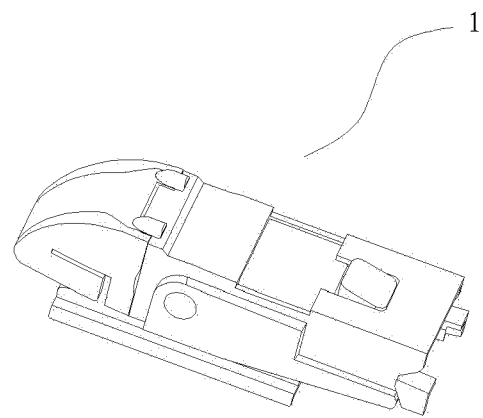
FIG. 1 is a cubic chart of this utility model.
Figure 2:
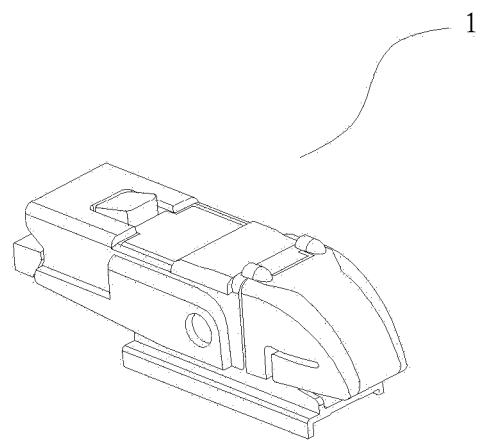
FIG. 2 is another cubic chart of this utility model.
Figure 3:
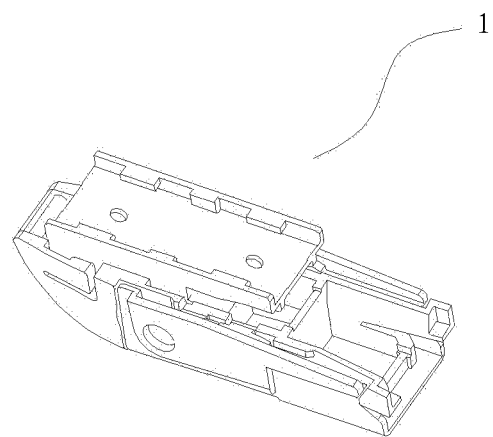
FIG. 3 is another cubic chart of this utility model.
Figure 4:
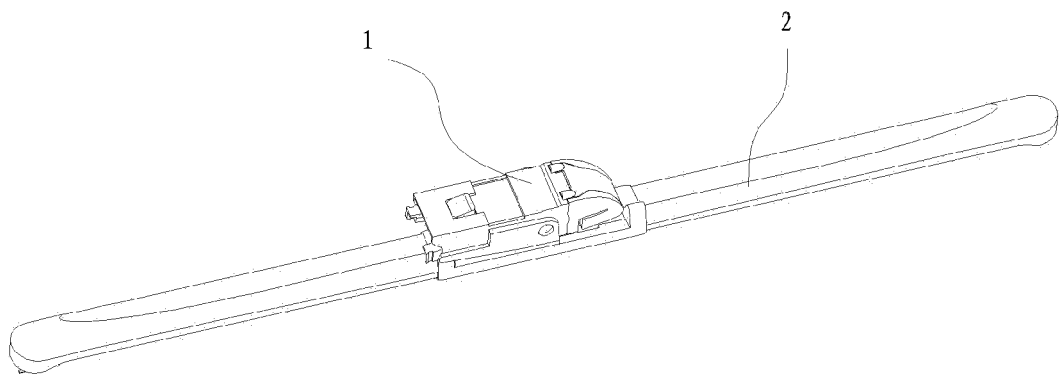
FIG. 4 is a diagram of connecting this utility model with the main body of windshield wiper.
Figure 5:
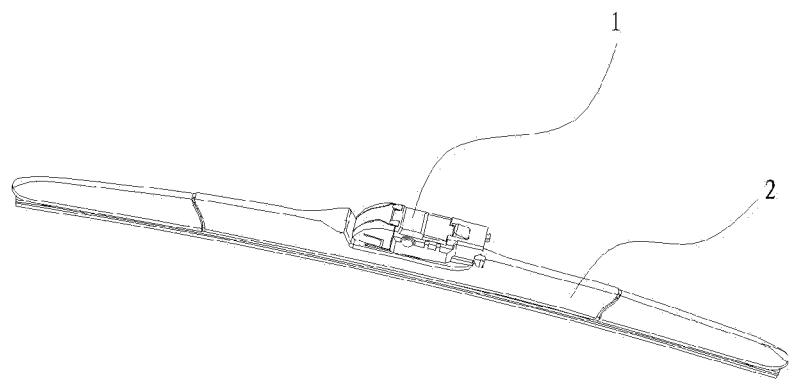
FIG. 5 is another diagram of connecting this utility model with the main body of windshield wiper.
Figure 6:
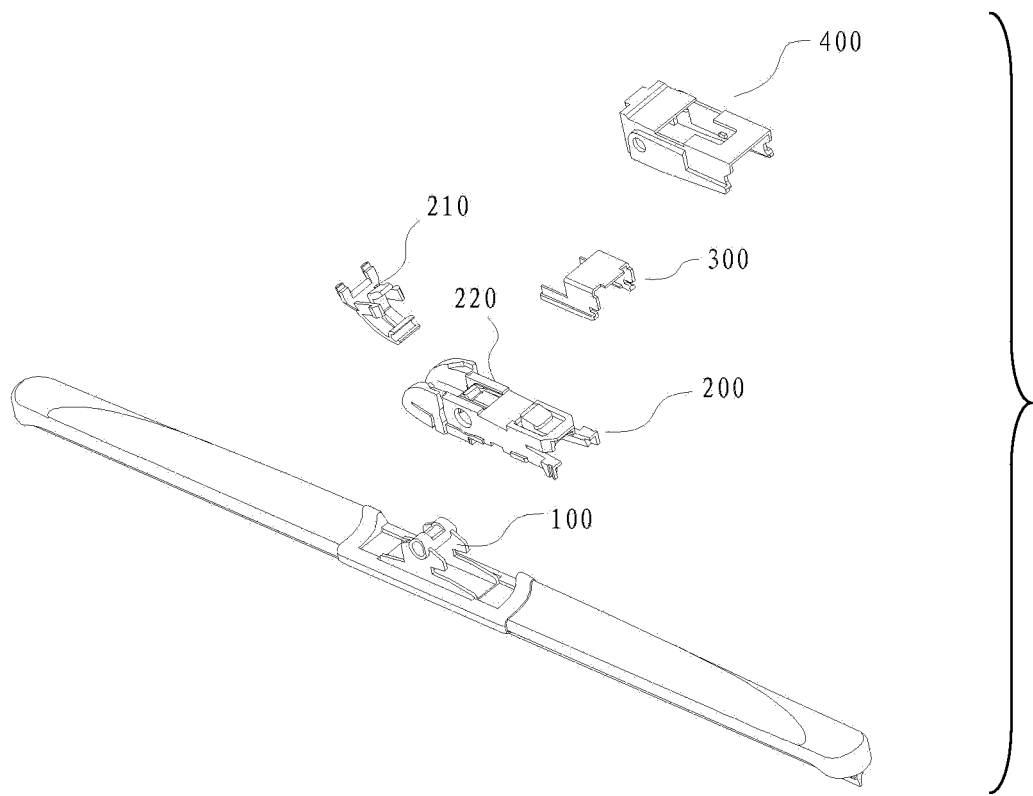
FIG. 6 is a decomposition chart of connection of this utility model and the main body of wiper.
Figure 7:
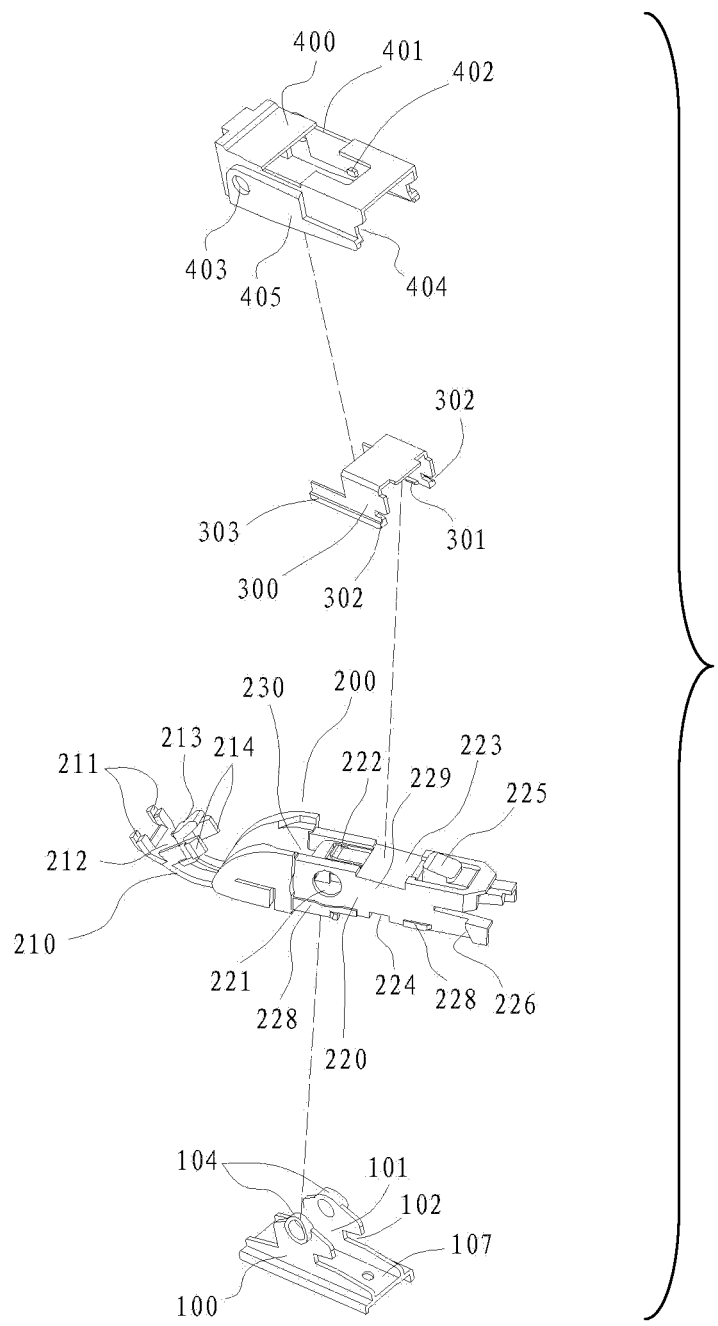
FIG. 7 is a decomposition chart of this utility model
Figure 8:
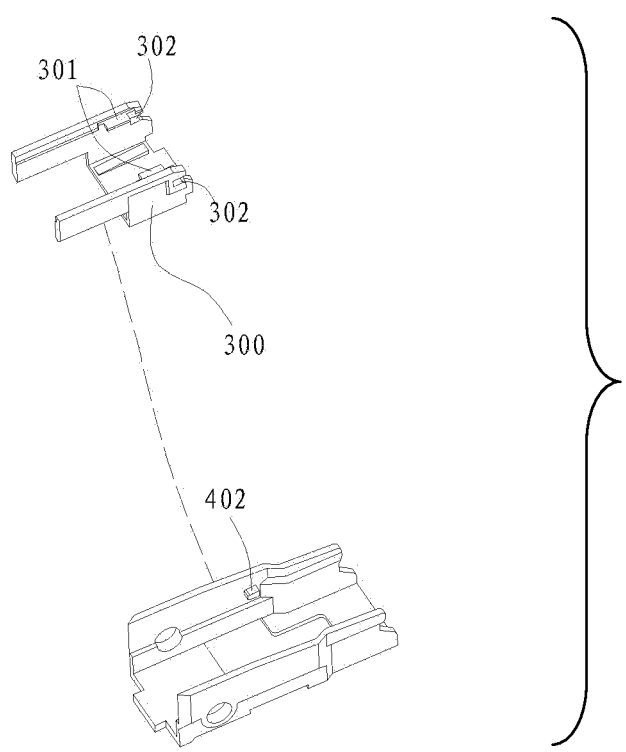
FIG. 8 is another direction view of decomposing the stop pad and the functional external cap of this utility model.

With the help of the attached diagrams, a further description is given to this utility model:

Example: Please refer to FIG. 1, FIG.2 and FIG.3 (the cubic charts of a kind of wiper connecting device (1) of this utility model); FIG. 4 and FIG.5 (schematic diagrams of a kind of wiper connecting device (1) of this utility model in order to connect with the main body of wiper), in FIG.6, the connecting device (1) is composed of base (100) and matched connector (200), stop pad (300) and functional external cap (400).

As shown in FIG.7 or FIG.13-FIG.24, a kind of windshield wiper connecting device includes base (100) and matched connector (200). The base (100) is mounted on the main body of wiper, and two side walls of the base (100) forms an internal slot (101). There are notches under two side walls respectively. Through-hole circular bulge rings (104) are set on outer side of two side walls. The bottom part of connector (200) is an opening structure, which is set on the base (100). The lower end face of connector (200) side wall is a ladder face. The connector (200) consists of connection main body and bulge half-ring head that forms because two side walls extend forward. A lower concave surface (223) is on the top face of connection main body, inner notches (224) are both side faces. The segmented lateral margins (228) are under two sides. The bulge half-ring in the front is equipped with a movable cap (210). There is a bulge pressing block (211) on two sides at the front end of the cap. The lower concave surface (223) on the top face of connection main body (220) matches with the stop pad (300). The stop pad is an n-shaped structure. At the bottom of two inner sides, there is a sticking point respectively, which connects with the inner notch (224) that corresponds to the connection main body (220). At the bottom of two sides of stop pad (300), there are limit flanged lips, and on both side faces of stop pad (300), there are two notch stuck-bosses (302). On the side face of connection main body (220), there is a straight-through circular hole that matches with the through-hole circular bulge ring (104) of base (100). There is a resilient strip (222) of stuck boss on the top face of connection main body (220). The face of stuck boss of resilient strip stretches into the notch (106) of circular pipe (104). At the back end of top face of connection main body (220), there is a stuck boss (225). Under two outer sides of connection main body (220), there are segmented lateral margins (flanged lips) (228). The width of connector (200) head is greater than width of two side faces of connection main body (220). Arc-shaped retaining walls (233) are at the head part of connector (200). At the front end of both retaining walls (233), there is a pin that is used to connect with a movable cap (210). There are two bulge pressing blocks (211) at the front edge of cap (210). On both sides of cap (210), there are fixed sticking point resilient strips (214).The outward-bulge sticking point of the resilient strip is buckled into a corresponding stuck slot on two retaining walls (233). The stuck slot is located in the inner side face of two retaining walls (233), the inner side face sets a half-opening resilient strip (227). A passing slot (212) is set inside the cap (210), a limit baffle plate (213) under the slot. The top end of cap (210) extends towards outer side into the corresponding grove of two retaining walls (233). On both side faces of the main body (220) of connection, the straight-through circular hole (221) matches the above-mentioned stuck boss (105) into one, which is capable of rotating a certain angle. A position-limiting ditch groove (231) forms inside the connection main body (220), along with the height-limiting ribs at the back of connection main body (220), achieve a position limit through a matching. The resilient-strip stuck boss (226) is set at the back end of connection main body (220). In the middle of top face of connection main body (220), there is a lower concave surface (223), which is located between the resilient strip (222) and stuck boss (225). Further, the connector (200) is coupled with the stop pad (300). The stop pad (300), an n-shaped structure, is stuck into the lower concave surface (223) of connection main body (220). At the bottom of two inner sides of stop pad (300), the sticking points connect respectively with the corresponding inner notches (224) of connection main body (220). At the bottom of two sides of stop pad (300), there are limiting flanged lips (303). This utility model also includes functional external cap (400). This cap is stuck onto a composite unit of connector (200) and stop pad (300). There is an opening (401) in the middle of top face of functional external cap (400). On either side inside it there is a bulge sticking point (402) that fixes the notch stuck-bosses (302) at the back end of both sides of stop pad (300). There is a through hole(403) at the position of the straight-through circular hole (221) of connection main body (22), and through the functional external cap (400) trial-part end face (404) and the resilient-strip bosses (226) on both sides under the back end of connector , a fixation is given to limit the slipping out.

This utility model is a kind of wiper connector structure, which is a combination of all parts and may be suitable for installation of all types of wiper arms. The structure has a base (100) on which a connector (200) is mounted, and the connector can be also called main body above which the functional n-shaped stop pad (300) is mounted. Above it the functional external cap (400) is mounted. A whole wiper joint comes into being. Through the base, the joint is mounted on any style of main body of wiper. Various parts are specifically described below:

Part 1-base (100) has an internal slot (101), and two side walls inside the base (100) form the slot. At the lower side of two side wall faces there are notches (102). Through-hole circular bulge rings (104) are set at the outer side of two side walls. The basal part of base (100) is a face (100) that connects with the main body of wiper.

Part 2-connector (200) designs a movable cap (210) and connection main body (body) (220), at the front edge of head cap (210) there are two bulge pressing blocks (211), inside it there is a ditch groove (212) under which there is a top plate. On both sides of cap (210) there are fixed sticking point resilient-strips (214). There is a straight-through circular hole (221) on the side face of connection main body (210), a resilient strip (222) with stuck dummy-club on top face, an inner notch (224) in the middle under both sides, a bulge stuck dummy-club (225) at the back end, stuck dummy-clubs (226) at both sides of back end, half-opening resilient strip (227) on both sides of head, and segmented lateral margins (flanged lips) (228) under two outer sides.

Part 3-functional n-shaped stop pad (300) has stuck points (301) at the bottom of two inner sides, notch stuck dummy-clubs (302) on both sides limit flanged lips (303) on both sides.

Part 4-functional external cap (400) has a big opening (401) in the middle of its top face. Either side inside it has a bulge stuck point (402), and there is a through hole (403) on both sides.

Description of Combination of All Parts:

1. The straight-through circular hole (221), located on both side faces of the main body of connection, match the through-hole circular bulge ring (104) into one, which may rotate a certain angle.

2. The n-shaped stop pad (300) is stuck into the lower concave surface (223) on top face of connector (200), and through a matching of the sticking points (301) at the bottom of inner side and the inner notch (224) in the middle under both sides of main body (200), a fixed connection is given so as to become one.

3. The functional external cap (400) is stuck into a combination of connector (200) and n-shaped stop pad (300), and through the bulge sticking points (402) on both sides of internal part and the notch stuck-boss (302) (inner notch) on both sides, a fixation is given, and through the end face (404) at the trail and the stuck boss (226) on both sides under the back end of main body (200), a fixation is given to limit slipping out.

4. The movable cap (210) at the front end of connector (200) has a matched fixation with the half-opening resilient strip (227) on both sides of main-body head through sticking point resilient strip (214) on both sides, and the movable cap (210) (front cover) may be opened through an inward pressing of the resilient strip (227) at the head part of main body.

Figure 9:
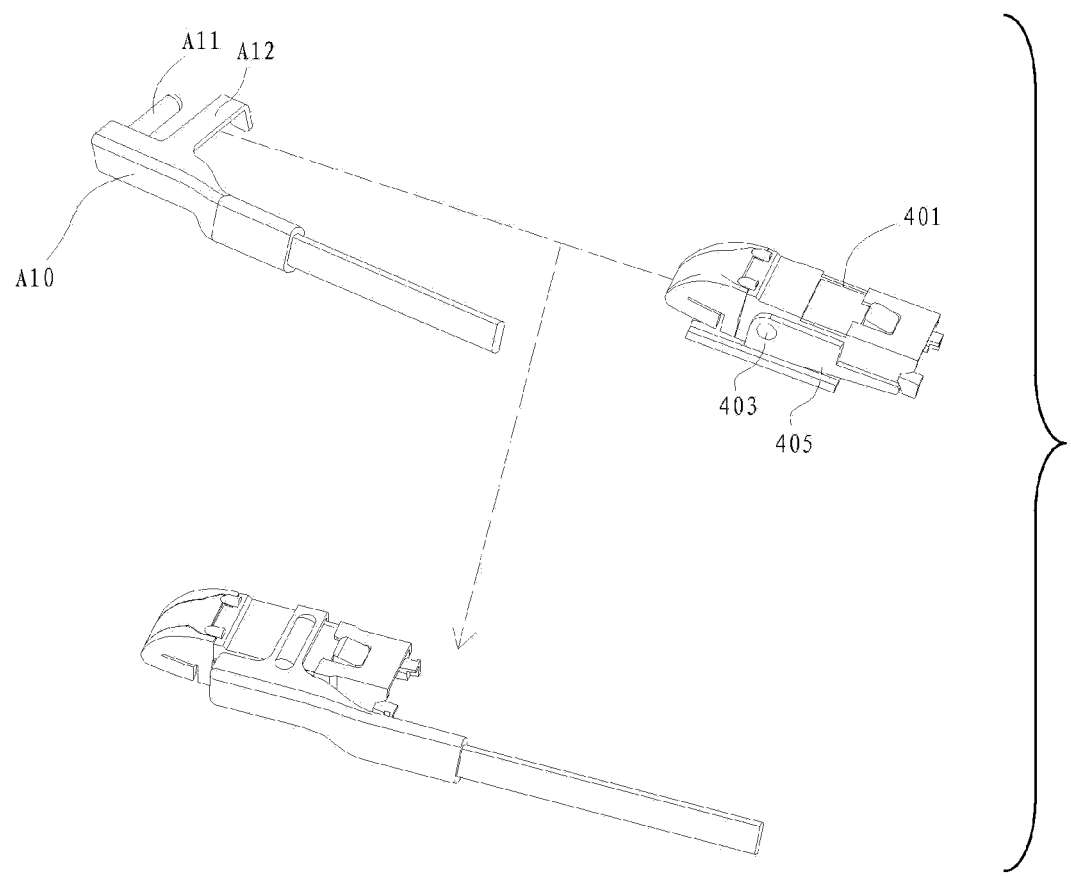
FIG. 9 is a structural diagram of the first embodiment of this utility model and the windshield wiper arm.
Figure 10:
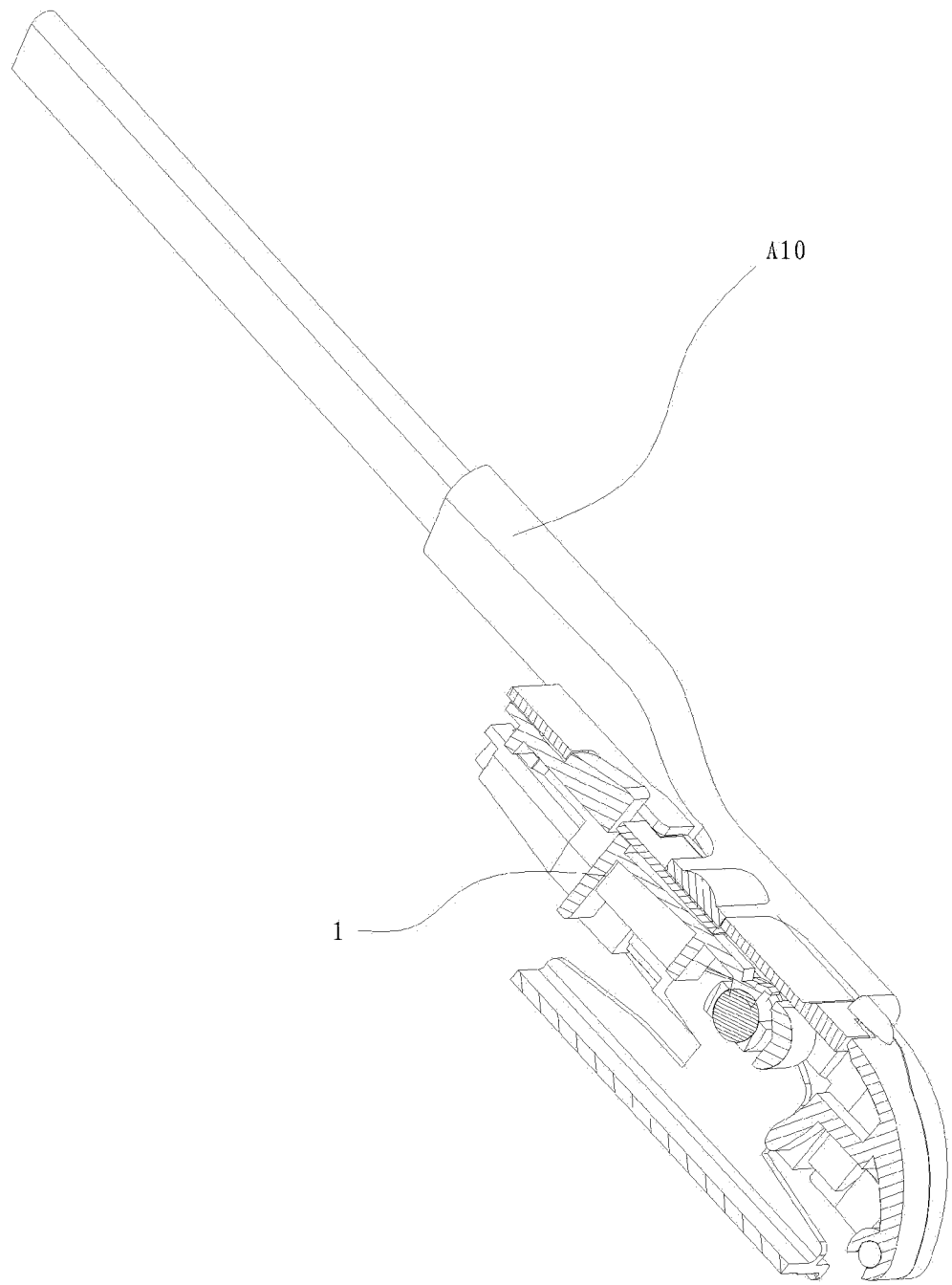
FIG. 10 is a section view of the first example of this utility model and the windshield wiper arm.

When installating, let the base (100) slips the connector (200) on, and in proper order, the stop pad (300) and functional external cap (400) get stuck on the connector, and the straight-through circular hole (221) in the middle of connector (200) matches with the circular pipe (104) of base (100), and further by the base (100), the connecting device is fixed in the middle of wiper rod. This utility model adopts the above-mentioned structure, which may connect many kinds of wiper arms with different style of structure, improving the adaptation of wiper. Specific examples of matched connection of this utility model connecting device and wiper arms with any of several kinds of structures are given below:

Description of Installation and Function Implementation of All Kinds of Wiper Arms As shown in FIG. 9 and FIG. 10, the first embodiment of this utility model is a matched fixation of this connecting device and the wiper arm (A10). The wiper arm (A10) is an existing structure. The connecting device of the utility model is a combination of base (100), connector (200), stop pad (300) and functional external cap (400), and through the external-cap through hole (403) of combined joint and the base circular-pipe (104), matches with the round pin (A11). The both side faces (405), along with the big opening (401), form a lower concave surface, which matches with the curve-shaped pressing plate (A12) of wiper arm (A10) to achieve an installation and use of wiper arm (A10).

Figure 11:
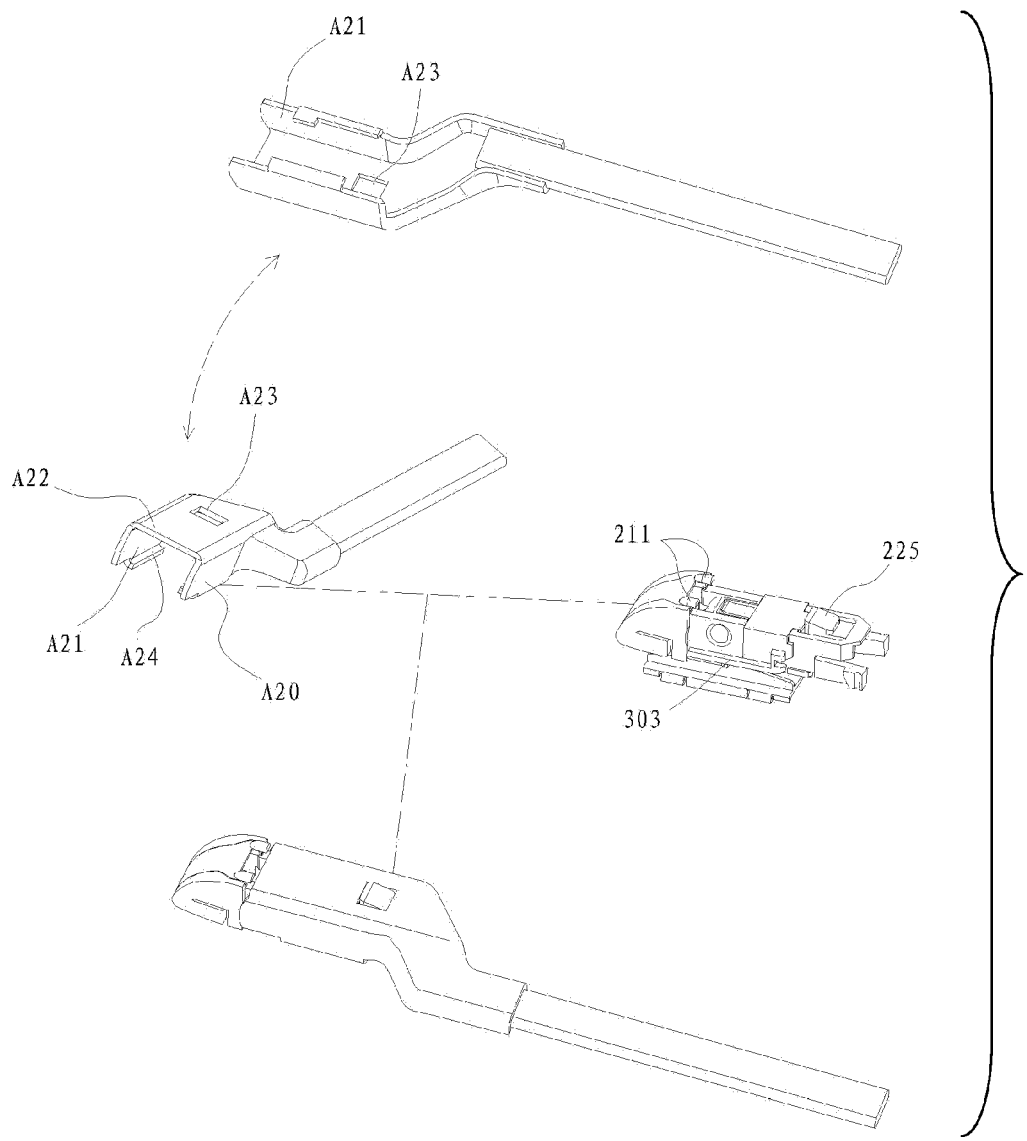
FIG. 11 is a structural diagram of the second example of this utility model and the windshield wiper arm.
Figure 12:
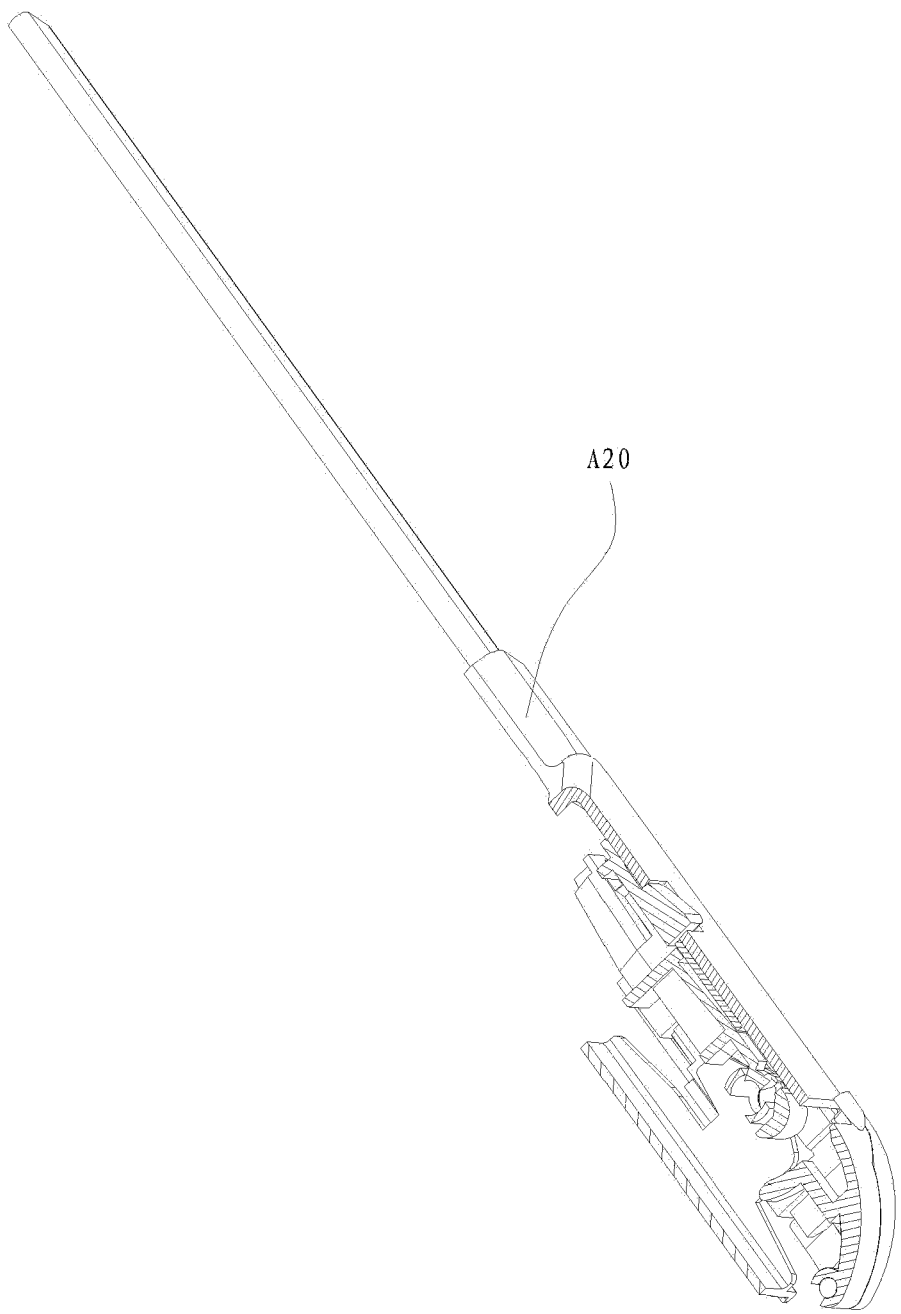
FIG. 12 is a section view of the second example of this utility model and the windshield wiper arm.

As shown in FIG. 11 and FIG. 12, this is the second embodiment of this utility model and wiper arm. After the functional external cap (400) of combined joint is removed, a combination of base (100), connector (200) and stop pad (300) remain. An installation and usage of wiper arm (A20) is achieved through a matching of the limiting flanged lips on both sides of n-shaped stop pad (300) with the inner side wall (A21) of wiper arm (A20) and inward bending face (A24), and through pressing the front edge (A22) tightly with two bulge pressing blocks (211) of movable cap (210) at the front end of connector (200), and through a matching of the stuck boss (225) on top face of the back end of connector (200) with the wiper arm hole (A23) in order to limit the slipping out.

Figure 13:
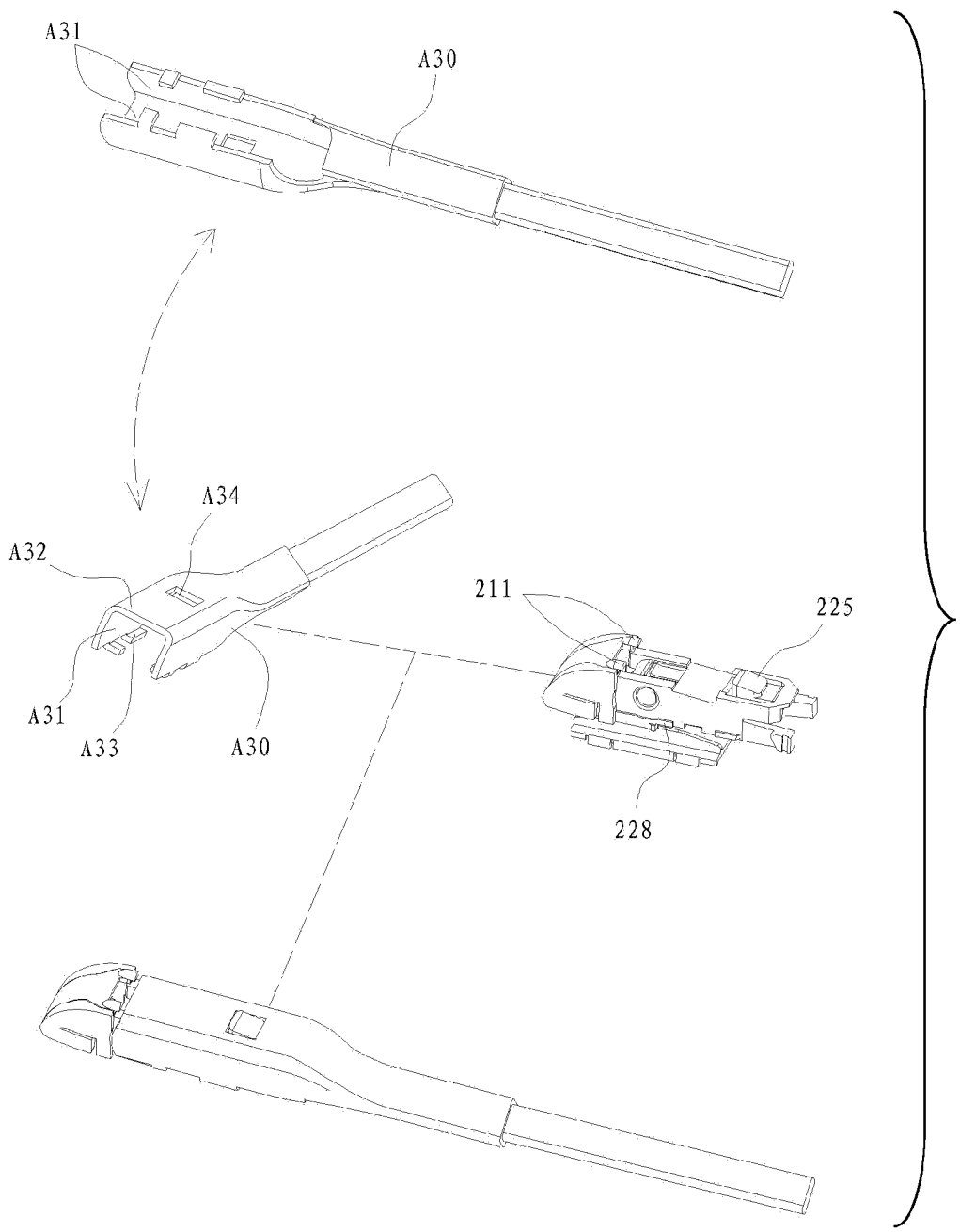
FIG. 13 is a structural diagram of the third example of this utility model and the windshield wiper arm.
Figure 14:
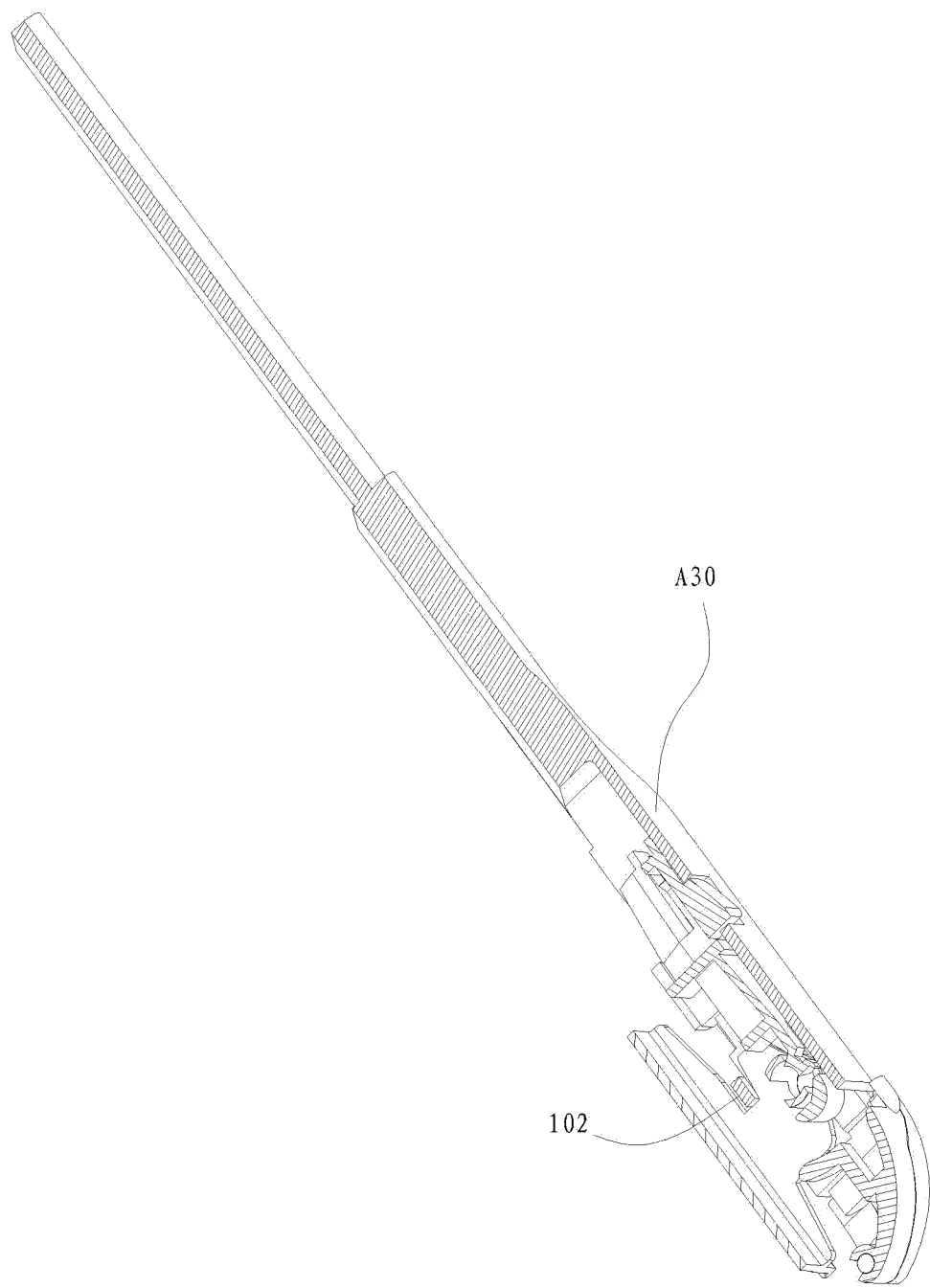
FIG. 14 is a section view of the third example of this utility model and the windshield wiper arm.

As shown in FIG. 13 and FIG. 14, this is the third embodiment of this utility model and wiper arm about connection. After the n-shaped stop pad (300) of composite unit is removed, and through a matching of segmented lateral margins-flanged lips (228) on both side faces of connector (200) and notches (102) on side faces of base with the inner side wall (A31) of wiper arm (A30) and the inward bending face (A33), and through pressing the front edge (A32) at top face of wiper arm with two bulge pressing blocks (211) of movable cap at the front end of connector (200), and through a matching of the stuck boss (225) at the back end of main body (200) with the wiper-arm hole (A33) in order to limit the limiting out, and through the position-limiting notch (102) of base (100) to limit the angle of rotation, an installation and usage of wiper arm (A30) is achieved.

Figure 15:
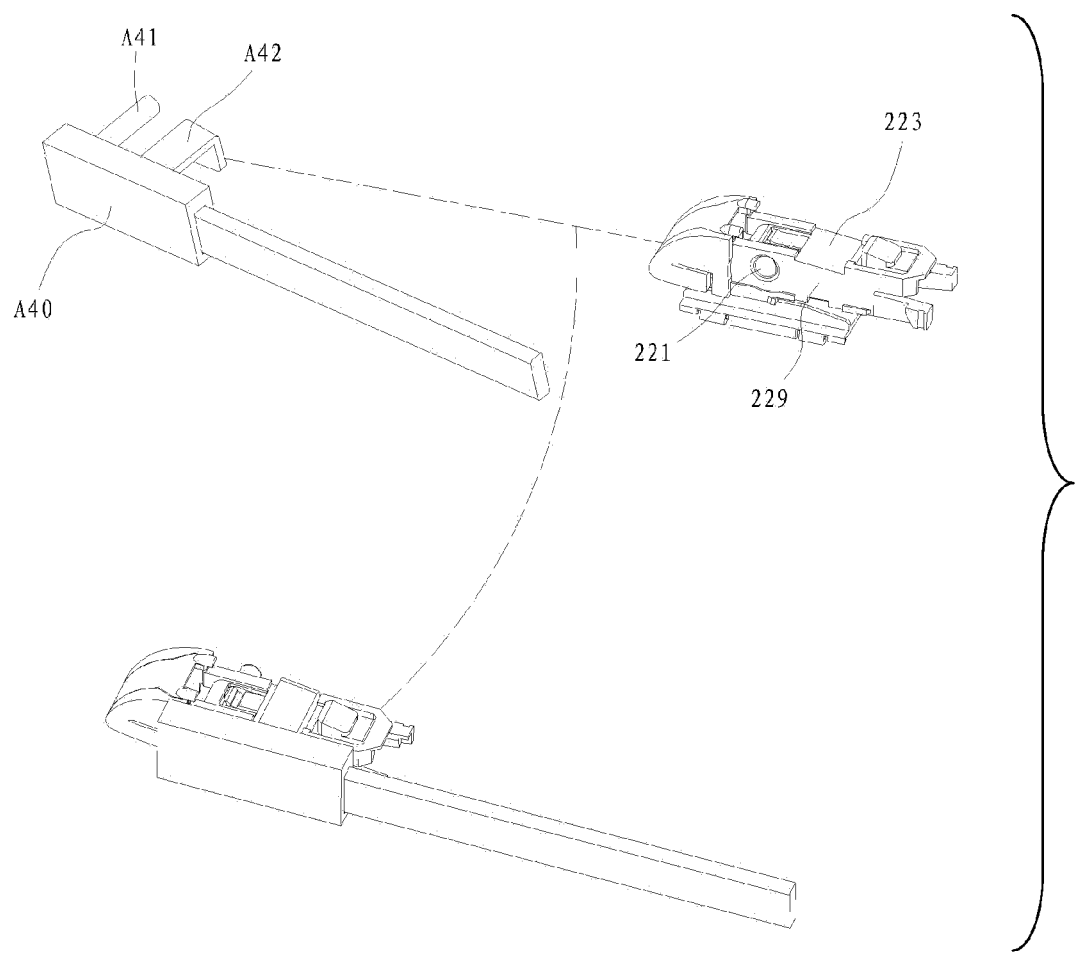
FIG. 15 is a structural diagram of the fourth example of this utility model and the windshield wiper arm.
Figure 16:
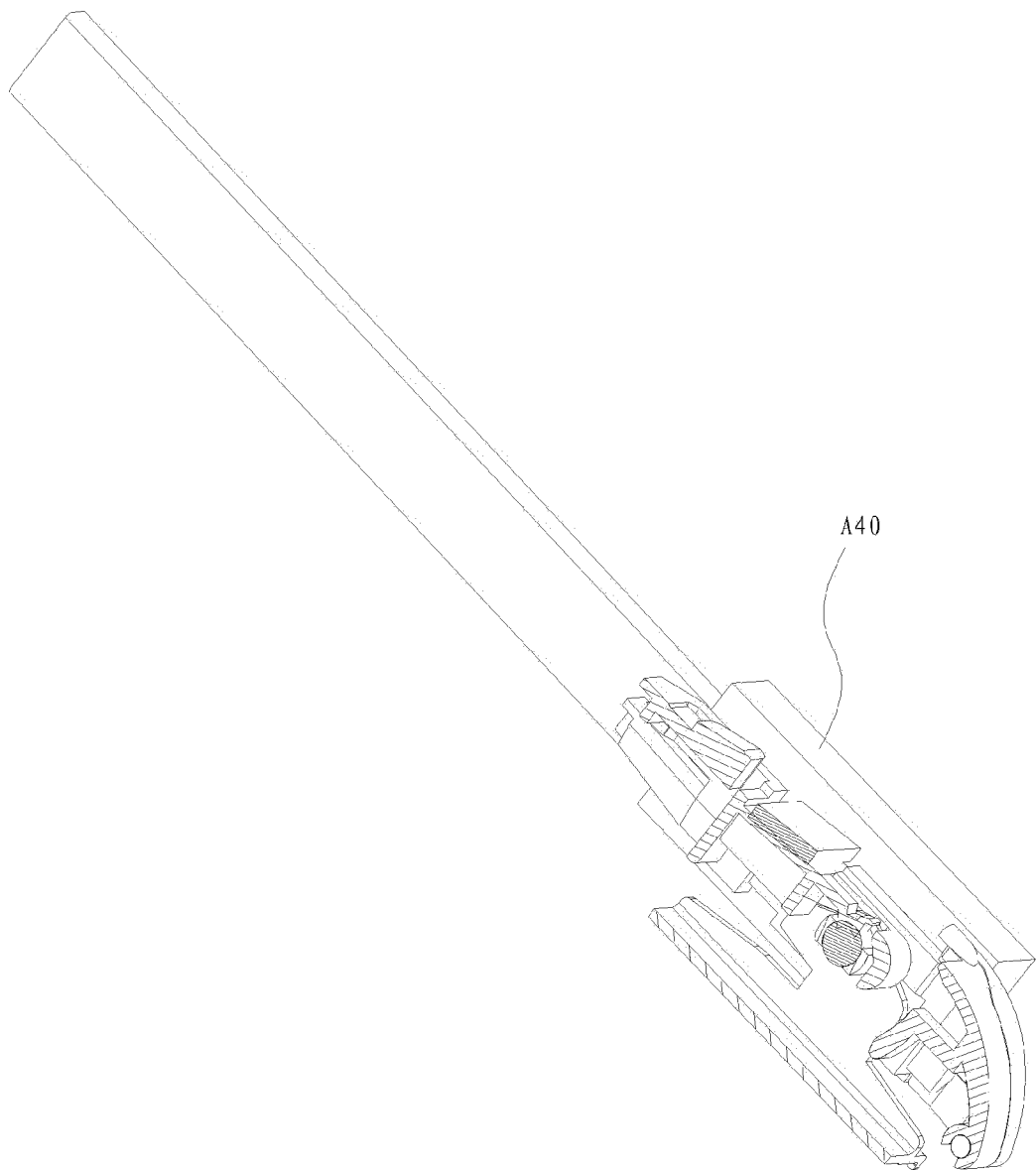
FIG. 16 is a section view of the fourth example of this utility model and the windshield wiper arm.

As shown in FIG. 15 and FIG. 16, this is the fourth embodiment of this utility model and wiper arm about connection. An installation and usage of wiper arm (A40) is achieved through a matching of circular pipe (104) of base (100) with the circular pin (A41) of wiper arm (A40), and through a matching of lower concave surface (223) in the middle of top face of connector (200) and two side faces (229) of connector (200) with the bending pressing plate (A42) of wiper arm (A40).

Figure 17:
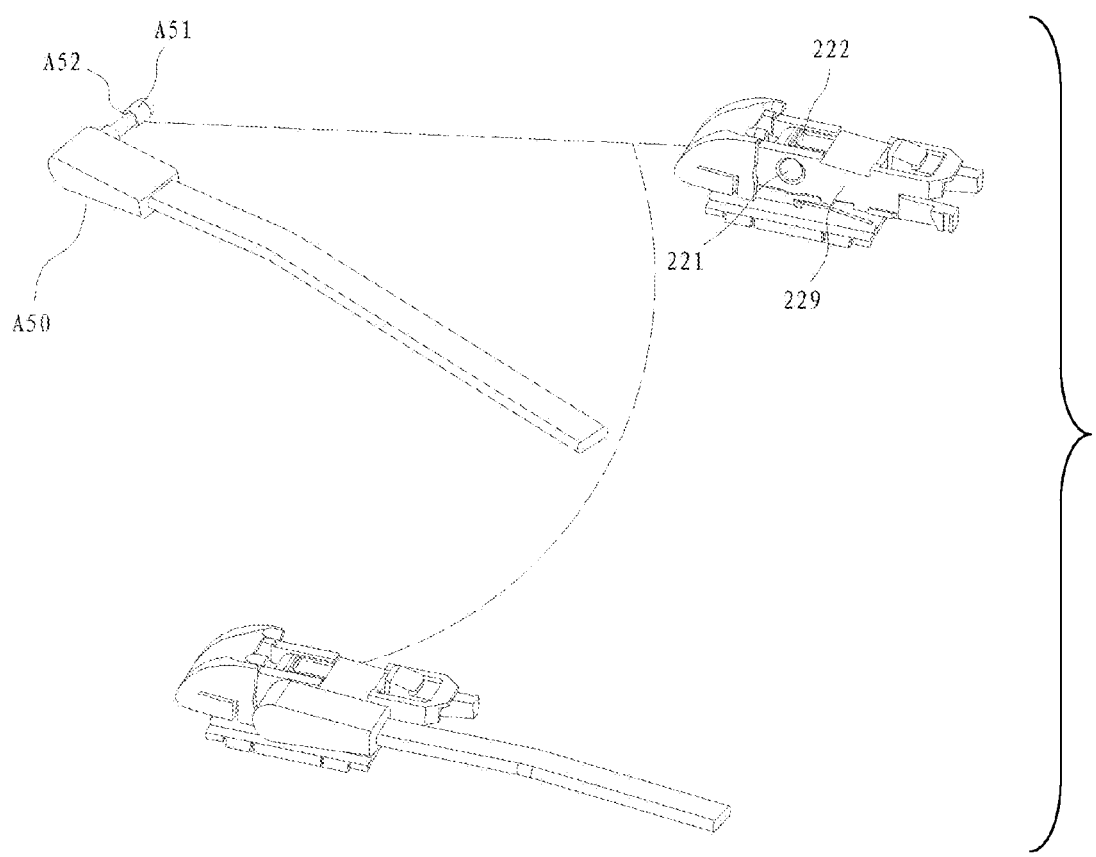
FIG. 17 is a structural diagram of the fifth example of this utility model and the windshield wiper arm.
Figure 18:
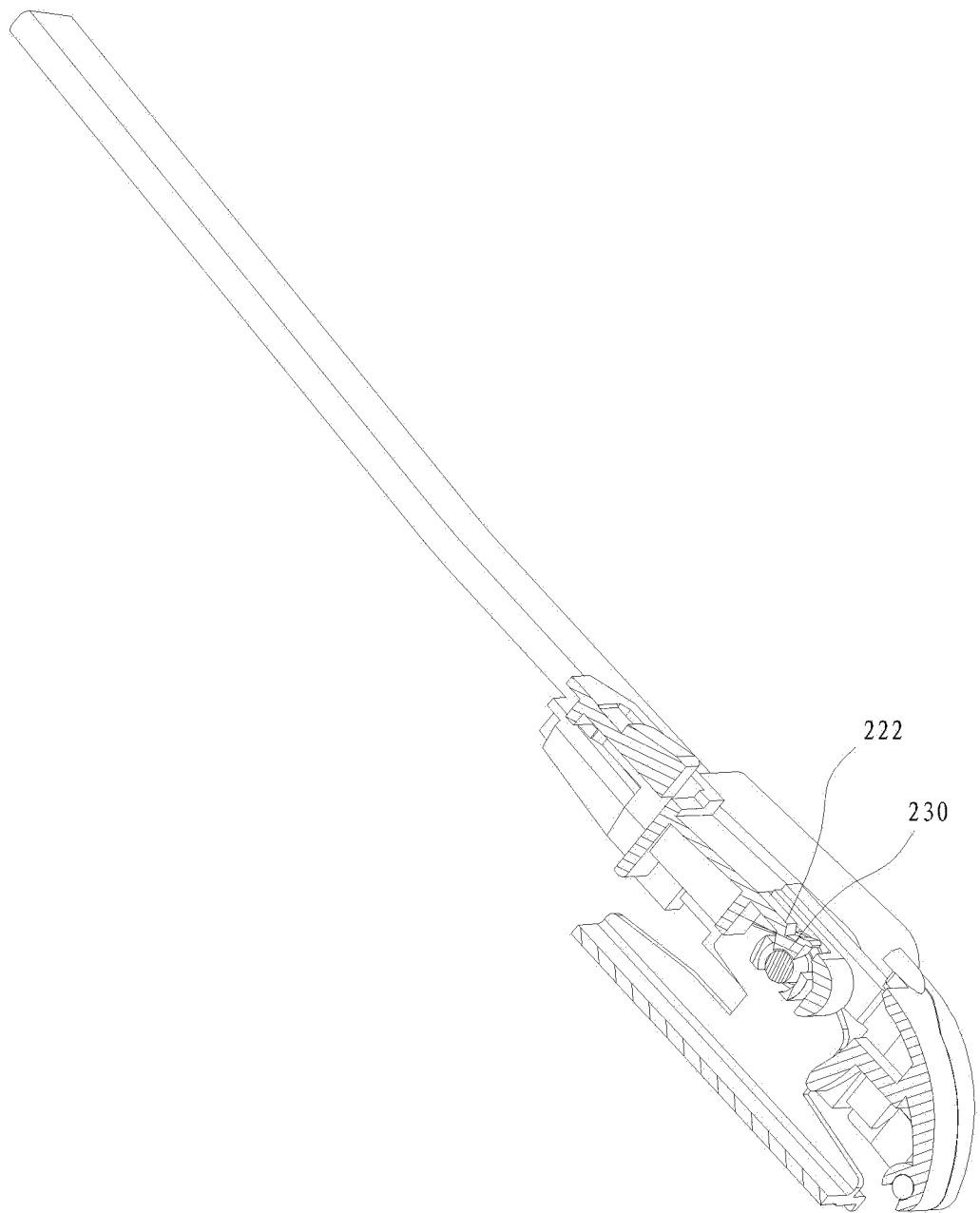
FIG. 18 is a section view of the fifth example of this utility model and the windshield wiper arm.

As shown in FIG. 17 and FIG. 18, this is the fifth embodiment of this utility model and wiper arm about connection. An installation and usage of wiper arm (A50) is achieved through a matching of circular pipe (104) of base (100) with circular pin (A51) of wiper arm (A50), and through a matching of inner stuck boss 230 (arc-shaped jaw) of stuck-boss resilient strip (222) at top face of connector (200) with the stuck slot (A52) of circular pin (A51) of wiper arm (A50), a fixation is given to limit the slipping out.

Figure 19:
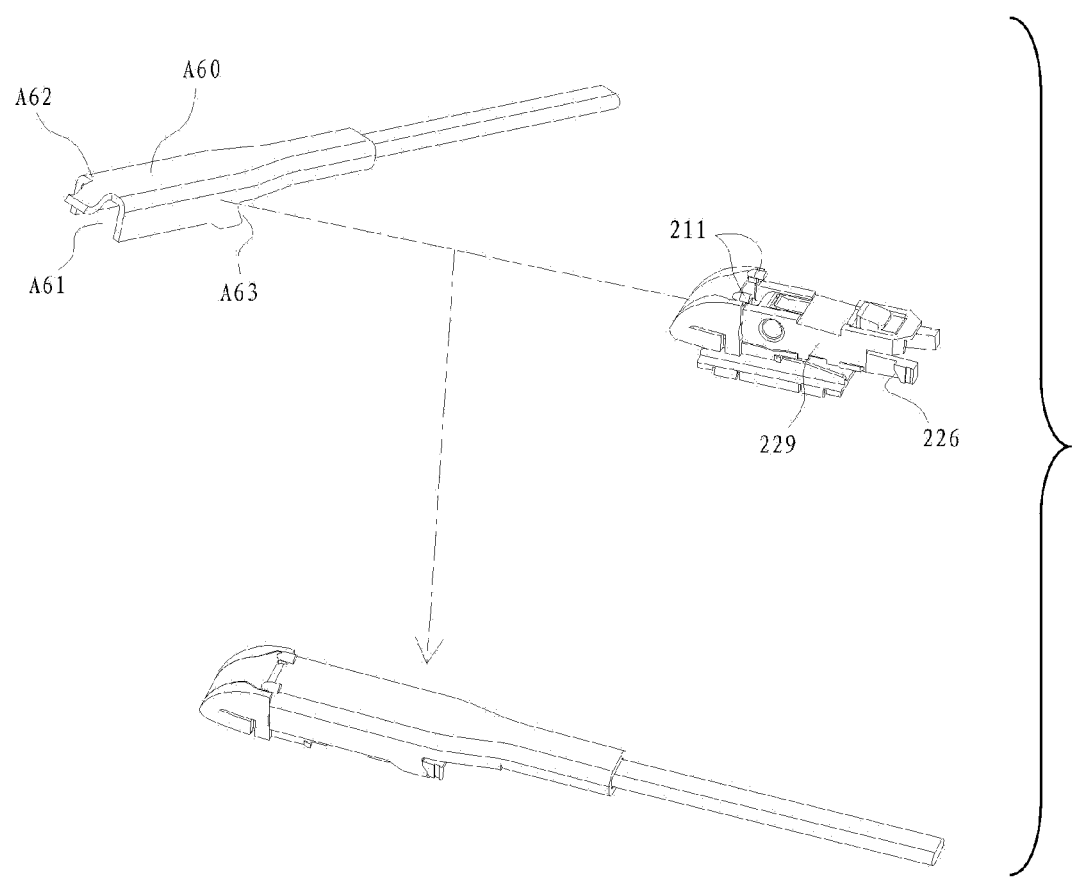
FIG. 19 is a structural diagram of the sixth example of this utility model and the windshield wiper arm.
Figure 20:
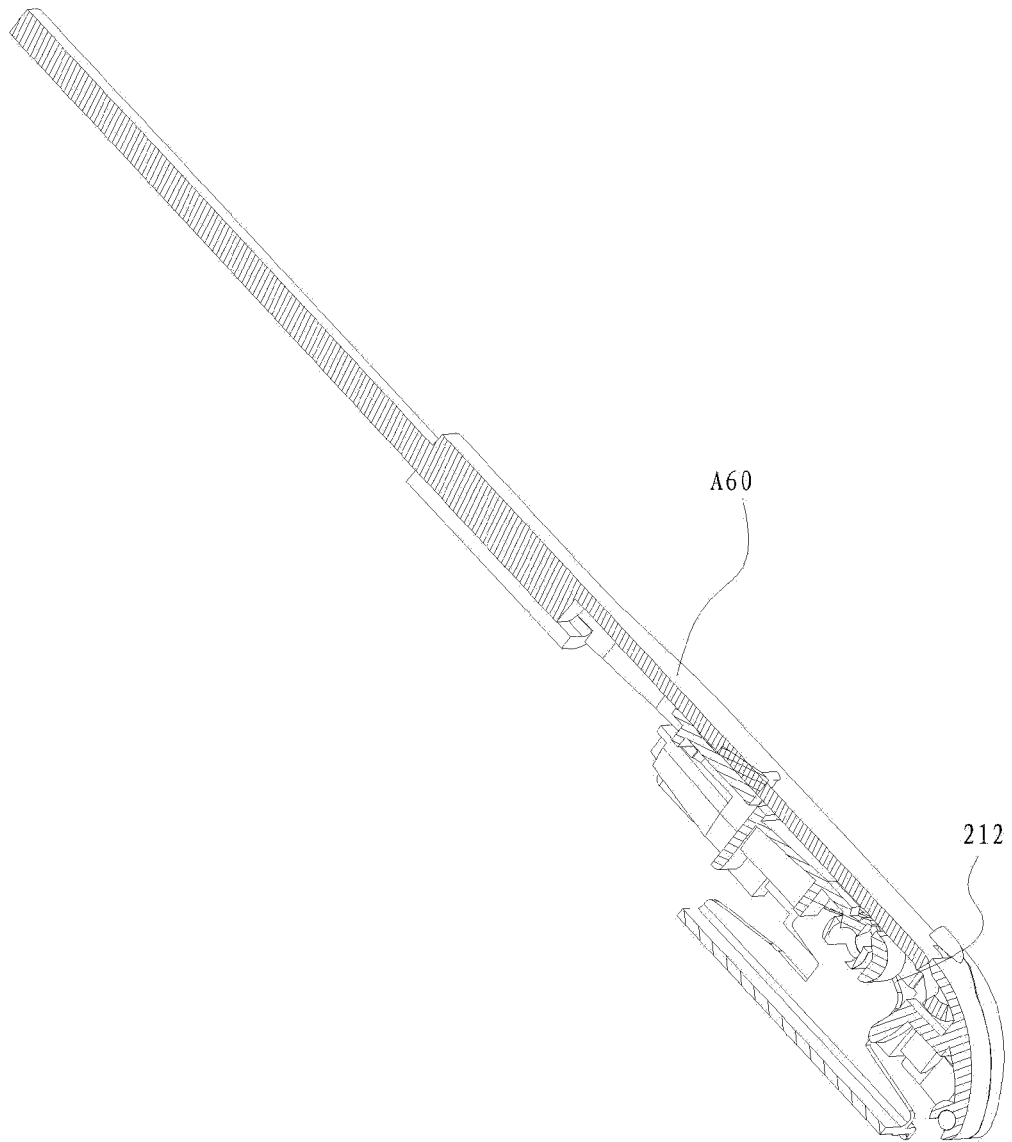
FIG. 20 is a section view of the sixth example of this utility model and the windshield wiper arm.
Figure 21:
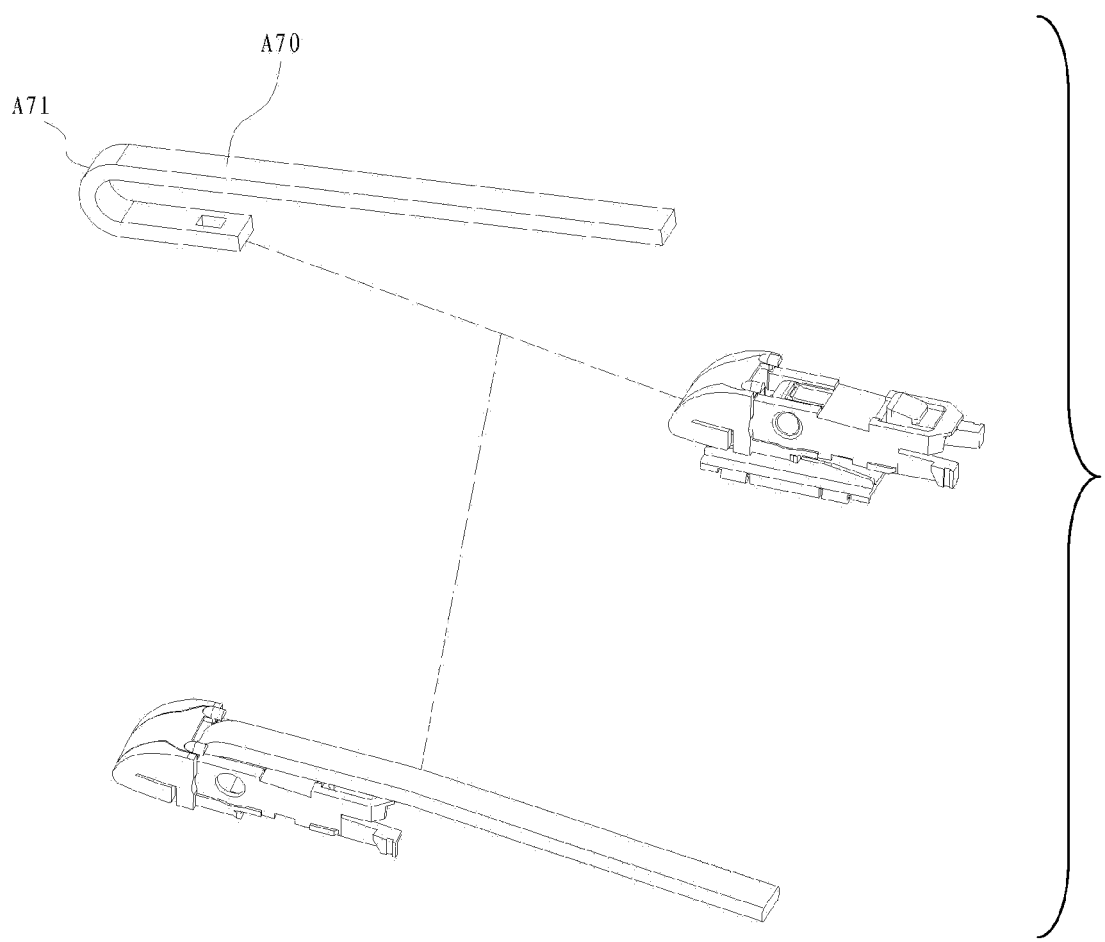
FIG. 21 is a structural diagram of the seventh example of this utility model and the windshield wiper arm.
Figure 22:
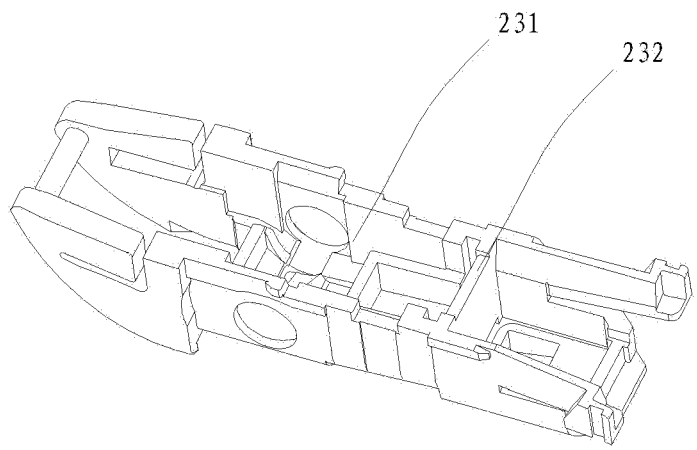
FIG. 22 is another direction view of this utility model connector.
Figure 23:
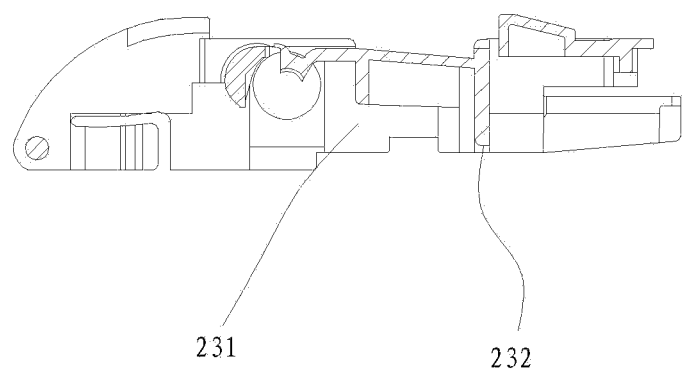
FIG. 23 is a section view of this utility model connector.
Figure 24:
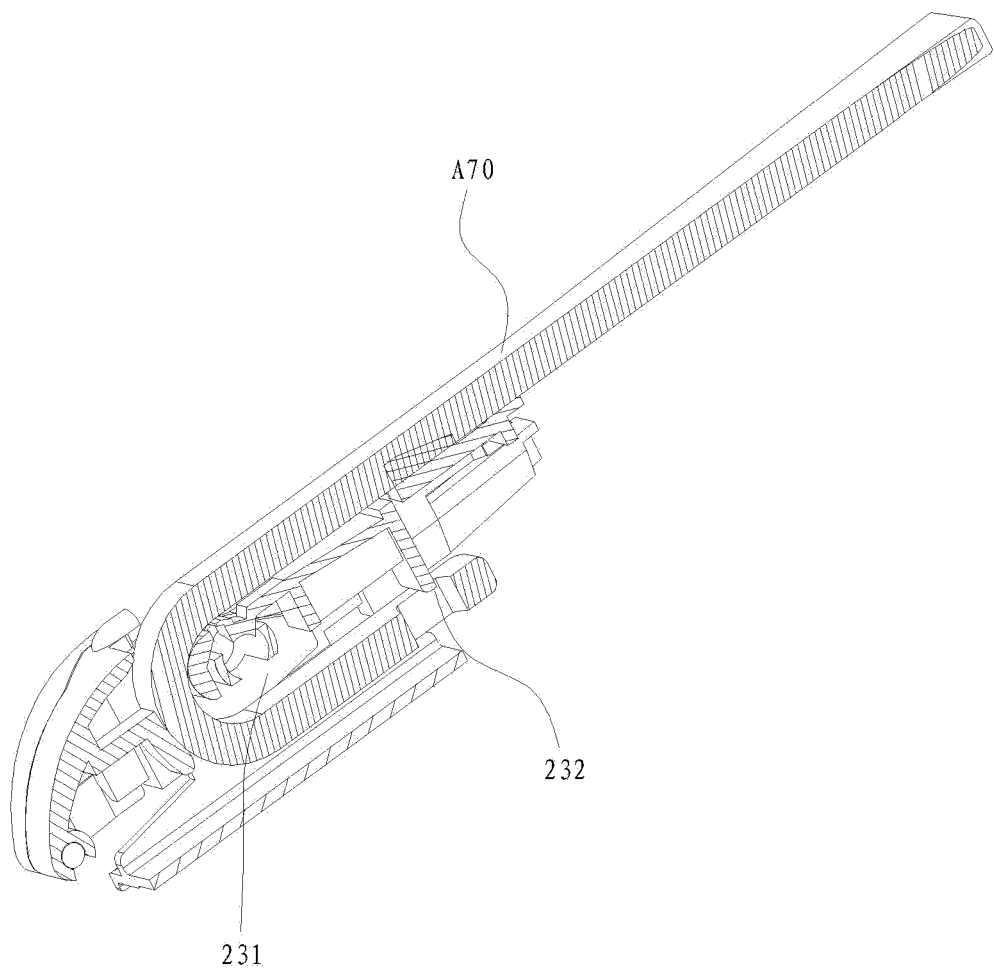
FIG. 24 is a section view of the seventh example of this utility model and the windshield wiper arm.

As shown in FIG. 19 and FIG. 20, this is the sixth embodiment of this utility model and wiper arm about connection. An installation and usage of wiper arm (A60) is achieved through a matching of two side faces (229) of connector (200) with the inner side wall (A61) of wiper arm (A60), and through pressing against the front eaves (A62) of wiper arm with two bulge pressing blocks (211) of movable cap at the front end of connector (200), and through a limit matching of stuck bosses (226) on both sides of back end of connector with the wiper arm (A63) so as not to slip out. The passing slot (212) of cap (210) plays a role of making room, as shown in FIG. 20.

As shown in FIG. 21 to FIG. 24, this is the seventh embodiment of this utility model and wiper arm about connection. An installation and usage of wiper arm (A70) is achieved through the matching of ditch groove (231) inside the connector (200) with the wiper arm (A70) so as to realize an installation and width limit, and through a matching with the height-limiting ribs (232) at the bottom of connector so as to realize a vertical fixation, and through a matching of top plate (213) under the cap at the front end of connector (200) with the front part (A71) of wiper arm to limit the slipping out.

The described above are merely embodiments of making use of technical content of this creation. All of polishes and changes, done by anyone who is familiar with this workmanship through a usage of the creation, belong to our patent scope, not limited to the person of disclosing the embodiments.

What is claimed is:

1. A windshield wiper connecting device, including a base (100) and a corresponding connector (200), is characterized by:
   the base (100), mounted on a wiper body, has a slot (101) between two side walls of the base (100); a notch (102) is disposed at a lower part of each of the two side walls, through-hole circular bulge rings (104) are provided at outer sides of the two side walls;
   the connector (200), whose bottom is an opening structure, is placed on the base (100), surfaces of two side walls of the connector (200) are terraced at their lower ends, and the connector (200) is composed of a connection main body (220) and a bulge half-ring head formed as a result of forward extension of the two side walls of the connection main body; there is a lower concave surface (223) on a top face of the connection main body (220), inner notches (224) on two side faces of the connection main body (220), and segmented lateral margins (228) at lower part of two sides of the connection main body (220); a bulge half-ring in front of the connection main body (220) is equipped with a movable cap (210), and each front end of two sides of the movable cap (210) has a bulge pressing block (211) extending therefrom;
   the lower concave surface (223) on the top face of the connection main body (220) matches an n-shaped stop pad (300); at two bottom inner sides of the stop pad (300), there are sticking points (301) that connect respectively with a corresponding inner notch of the inner notches (224) on the two sides faces of the connection main body (220); at two bottom sides of the stop pad (300), there are flanged lips (303); on two side faces of the stop pad (300), there are two notch stuck-bosses (302) respectively, and the two notch stuck-bosses (302) are also inner notches;
   on two side surfaces of the connection main body (220), there are two straight-through circular holes (221) respectively matching the through-hole circular bulge rings (104) on the two side walls of the base (100); width of a head part of the connector (200) is greater than width of the two sides of the connection main body (220).

2. The wiper connecting device as in claim 1, wherein the wiper connecting device also comprises a functional external cap (400), which buckles to an assembly of the connector (200) and the stop pad (300); there is an opening (401) in the middle of a top surface of the functional external cap (400); a straight-through hole (403) is provided on each of two sides of the functional external cap (400) at a position corresponding to a respective straight-through circular hole of the straight-through circular holes (221) on the connection main body (220); through an end face at a trail part (404) and a resilient-strip stuck boss (226) on a back end of each of two sides of the connector (200), fixation is given to limit the functional external cap (400) from slipping out.

3. The wiper connecting device as in claim 2, wherein the two notch stuck-bosses (302) of the stop pad (300) match respectively with bulge sticking points (402) on the functional external cap (400).

4. The wiper connecting device as in claim 1, wherein in the middle of the connector (200) there is a resilient strip (222), inside which there is a stuck boss (230) there are arc-shaped retaining walls on two sides of the head part of the connector (200), front ends of the two retaining walls connect the movable cap (210); a resilient-strip stuck boss (226) is provided at a back end of the connection main body (220); an outward-bulge stuck-boss is provided a top surface of the back end of the connection main body (220); there is a limit groove (231) inside the connection main body (220); the limit groove (231) is capable to achieve position limiting function by cooperating with height-limiting ribs (232) provided at back part of the connection main body (220).

5. The wiper connecting device as in claim 4, wherein a passing slot (212) is provided inside the movable cap (210); a limit baffle plate (213) is provided under the passing slot (212); on the two sides of the movable cap (210) there are resilient strips (214), each of which has an outward-bulge sticking point buckled into a corresponding stuck slot on each of the retaining walls, and each stuck slot is located on an inner side face of a respective retaining wall of the retaining walls each provided with a semi-open resilient strip.

6. The wiper connecting device as in claim 1, wherein on the two side faces of the connection main body (220), the straight-through circular holes (221) matches the through-hole circular bulge rings into one and are capable of rotating within a certain angle.

7. The wiper connecting device as in claim 1, wherein the base (100) and a main body of the wiper are fixedly connected through a ditch groove at a bottom part of the base (100) or through riveting.

* * * * *